UNITED STATES PATENT OFFICE.

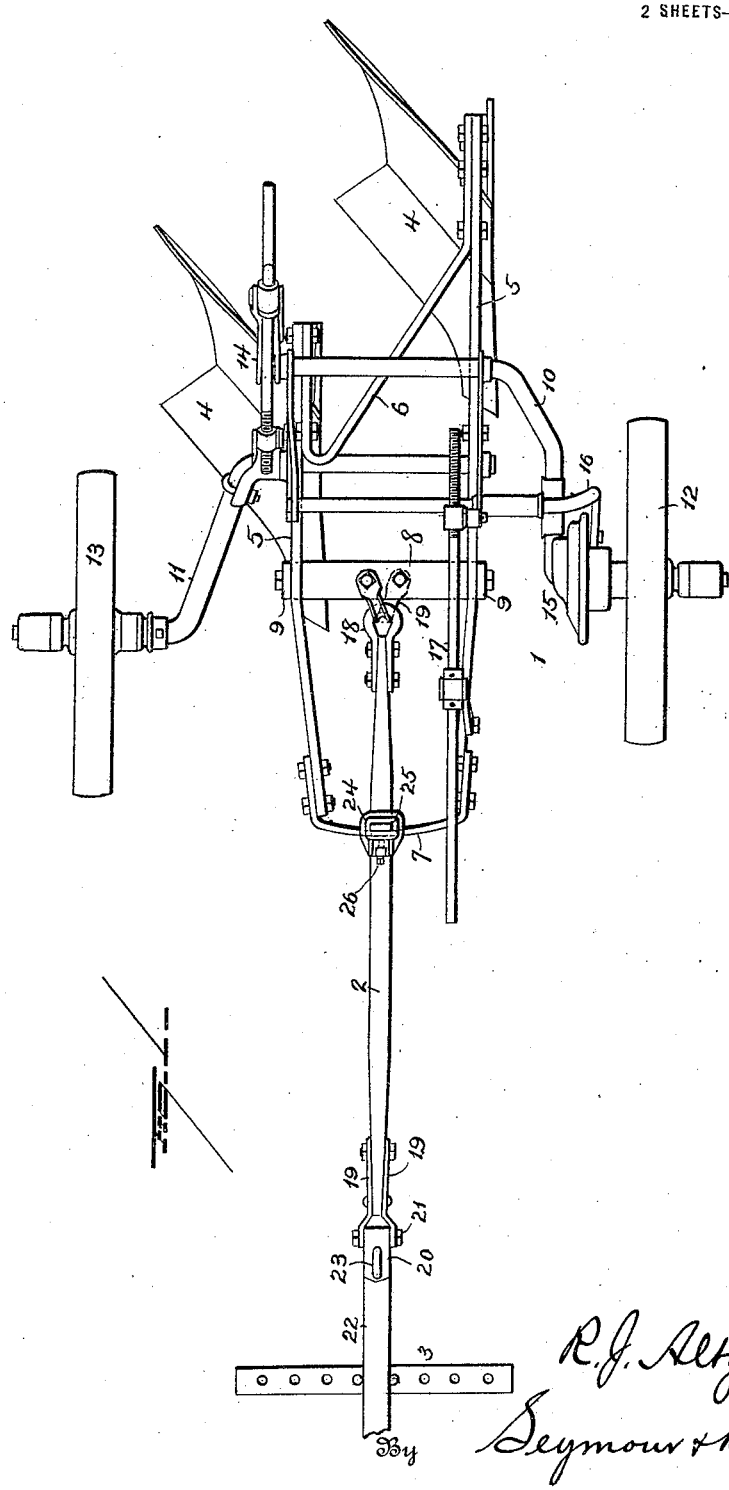

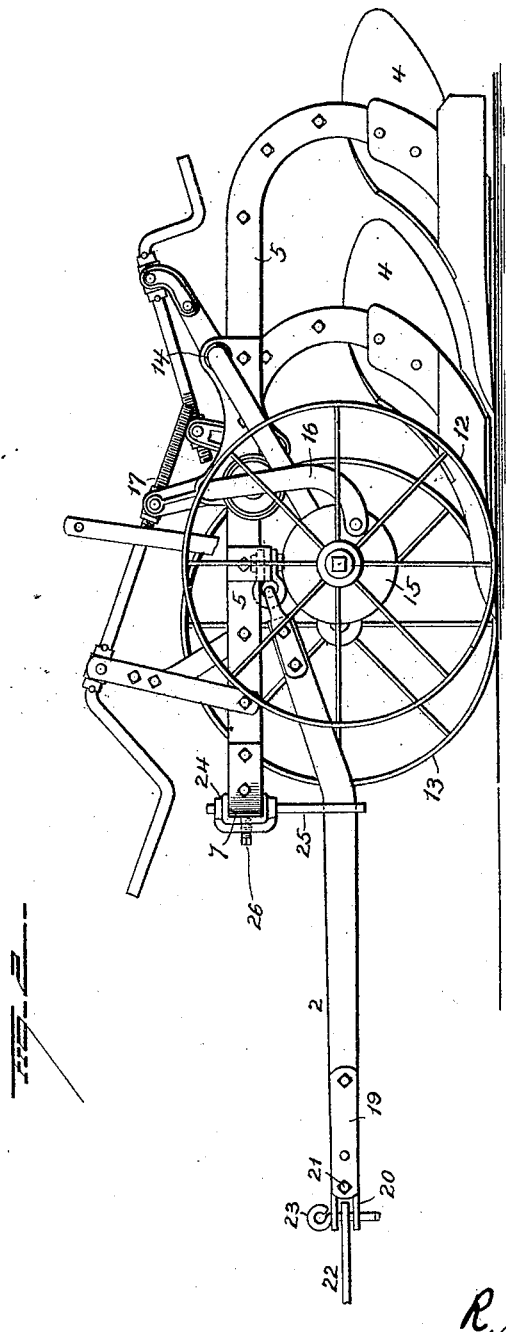

RUDOLPH J. ALTGELT, OF SOUTH BEND, INDIANA, ASSIGNOR TO OLIVER CHILLED PLOW WORKS, OF SOUTH BEND, INDIANA.

PLOW.

1,405,087.  Specification of Letters Patent.  Patented Jan. 31, 1922.

Application filed May 28, 1920. Serial No. 385,047.

*To all whom it may concern:*

Be it known that I, RUDOLPH J. ALTGELT, a citizen of the United States, and a resident of South Bend, in the county of Saint Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plow structures and more particularly to means for connecting the same with a tractor,—one object of the invention being to provide simple and efficient adjustable draft appliances whereby a multi-base plow may be so connected with a tractor that the latter may run either with one wheel in the furrow or with both wheels on unplowed ground.

A further object is to provide simple means for adjustably supporting the draft member of a plow structure, so that said member may be swung laterally and also moved in a vertical direction, whereby it shall be made adaptable to the hitching or fastening places of tractors of different makes.

A further object is to so connect a draft member to the frame of a wheeled plow, that when said draft member is connected with a tractor, the plow will be held in working position by the tractor, and necessity for the use of a trailing wheel will be obviated.

With these and other objects in view, the invention consists in certain novel features of construction and combinations of parts as hereinafter set forth and pointed out in the claims.

In the accompanying drawings; Figure 1 is a plan view of a plow structure showing an embodiment of my invention, and Figure 2 is a side elevation.

1 represents a plow structure connected, through the medium of a draft beam 2 and connecting devices with a tractor represented at 3.

In the drawing I have illustrated a two wheeled plow having two plow bases 4, 4 secured to standards at the rear ends of beams 5, 5. The rear portions of these beams are spaced apart by a diagonal brace 6 and their forward portions converge somewhat and are connected by a front cross bar or rail 7, which latter is shown in the drawing as being curved, but which might be straight. The intermediate portions of the beams are connected by a cross bar 8, the ends of which are provided with upturned flanges 9 bolted to the beams. The plow beams spaced apart and connected as above described constitute a plow frame, to which suitable bearings are secured for crank-axles 10—11 provided with spindle portions which enter the hubs of carrying wheels 12—13. The crank axles may be connected by adjustable devices indicated at 14, and the axle 10 may be connected with the carrying wheel 12 through the medium of clutch devices indicated at 15,—one member of which latter is connected with the plow frame through the medium of a lifting arm 16, thus providing power lift mechanism. The plow may also be provided with depth adjusting devices illustrated at 17. The power-lift mechanism and adjusting devices to which reference has been made do not constitute essential parts of my present invention and specific description of the same is not necessary herein.

The draft beam 2 has secured to its rear end a loop 18 which is loosely connected with the cross bar 8 of the frame, by means of a bracket 19, the arms of which are made divergent relatively to each other and bolted to said cross bar, over and under the same respectively. From its loose pivotal connection with the cross bar 8, the draft beam 2 extends forwardly below and a considerable distance beyond the front cross bar or rail 7 of the frame and to its forward end, plates 19 are secured. Between the forwardly projecting ends of the plates 19, a shackle 20 is pivoted by means of a horizontal bolt 21 and between the horizontal members of said shackle, the rear end of a hitch bar 22 is pivoted by means of a vertical pin 23,—said hitch bar being adapted in any suitable manner for connection with the tractor.

A clamp 24 is movably mounted on the front bar or rail 7 of the plow frame and its upper and lower arms are made with openings for the passage of a vertically disposed supporting bar or upright 25 which depends below the frame sufficiently to receive the draft beam 2 in its looped lower end portion. The bar or upright 25 is so located as to engage the inner face of the front cross bar or rail 7 and a set screw 26 passing through the clamp 24 serves to cause the latter to clamp the depending bar or upright 25 to the cross bar or rail 7 and to also secure said clamp to said cross bar or rail.

By loosening the set screw 26, the clamp 24 and supporting bar 25 may be moved on the cross bar or rail 7 and the draft beam thus swung laterally, and the depending supporting bar or upright 25 may be moved vertically.

The depending bar or upright 25 when clamped to the forward end of the frame supports the draft beam 2, but it will be seen that with the use of the devices above described which connect said depending bar with the frame, the draft beam may be adjusted laterally and vertically so as to adapt it for connection with tractors of different makes; that it may be so adjusted as to adapt it for connection with the tractor in such manner that the wheel or wheels at one side of the latter may run in the furrow, or so that the wheel or wheels at both sides may run on unplowed land, and that the draft beam may be securely connected with the forward end of the frame in any position to which it may be adjusted.

It will also be seen that with the use of my improvements, the wheeled plow structure will be held, by the tractor, in proper working position and thus obviate necessity for the use of a trailing wheel for supporting the rear part of the structure.

Various changes might be made in the details of construction of my invention without departing from the spirit thereof or limiting its scope and hence I do not wish to restrict myself to the exact details herein set forth.

Having fully described my invention what I claim as new and desire to secure by Letters-Patent, is:—

The combination of a plow frame, crank axle members both projecting forwardly when the plow is in working position, wheels at the forward ends of said crank axle members, a draft beam connected with an intermediate portion of the frame and also with the forward end thereof, the connection of said draft beam with the intermediate portion of the frame being in advance of the axle mountings on the frame, said draft beam projecting forwardly beyond the frame and adapted at its forward end for connection with a tractor, whereby the plow structure will be supported in working position by the tractor.

In testimony whereof, I have signed this specification in the presence of two subscribing witnesses.

RUDOLPH J. ALTGELT.

Witnesses:
T. C. CLINTON,
BESSIE M. ARNOLD.